United States Patent [19]

Raniero

[11] 4,128,252
[45] Dec. 5, 1978

[54] FOLDABLE SUITCASE DOLLY

[76] Inventor: John J. Raniero, Box 204, Gearhart, Oreg. 97138

[21] Appl. No.: 752,204

[22] Filed: Dec. 20, 1976

[51] Int. Cl.² .............................................. B62B 3/02
[52] U.S. Cl. ..................................... 280/40; 248/435;
  280/42; 280/655
[58] Field of Search .................. 280/42, 655, 652, 40, 280/47.29; 248/168, 169, 434, 435

[56] References Cited

U.S. PATENT DOCUMENTS

| | | | |
|---|---|---|---|
| 2,563,033 | 8/1951 | Greig | 280/42 X |
| 2,648,545 | 8/1953 | Cassidy | 280/42 |
| 2,743,115 | 4/1956 | Rutledge | 280/42 |
| 3,197,226 | 7/1965 | Erlinder | 280/655 X |
| 3,241,852 | 3/1966 | Muller et al. | 280/40 |
| 3,730,587 | 5/1973 | Bloxham et al. | 248/435 X |
| 3,747,882 | 7/1973 | Leis | 248/169 X |
| 3,834,548 | 9/1974 | Cliffton et al. | 248/435 X |

FOREIGN PATENT DOCUMENTS

1515494  1/1968  France ..................................... 248/169

Primary Examiner—Evon C. Blunk
Assistant Examiner—Michael J. Forman
Attorney, Agent, or Firm—Kolisch, Hartwell, Dickinson & Stuart

[57] ABSTRACT

A foldable hand truck including an elongate telescopic central member and a pair of elongate legs pivotally connected to the lower end of the central member for swinging between positions extending either along and parallel to the central member or extending outwardly at a substantial angle therefrom. Elongate locking members are pivotally connected at one set of their ends to the legs and are slidable at their inner ends along the central member between positions spaced a considerable distance from the pivot connection for the legs, to permit collapsing of the legs, and a more closely spaced relationship with said pivot connections for the legs to lock the legs in their extended positions. Wheel assemblies are mounted on the legs and are swingable between stored positions closely adjacent the legs and operating positions extending outwardly therefrom. Load support arms are swingable between collapsed positions extending longitudinally of the central member and operating positions extending outwardly therefrom at substantial angles relative to each other and diverging on progressing outwardly from the central member to provide a wide based load support.

5 Claims, 7 Drawing Figures

FOLDABLE SUITCASE DOLLY

BACKGROUND AND SUMMARY OF THE INVENTION

This invention relates to a foldable hand truck, and more particularly to such a hand truck which is suitable for transporting luggage.

In the past, various collapsible hand trucks, or luggage carrying dollies, have been devised. For the most part, however, these are unnecessarily complicated and expensive, or are too bulky to be stored or carried conveniently when not in use.

A general object of the present invention is to provide a novel foldable hand truck which is simply and economically constructed.

Another object of the present invention is to provide a novel hand truck which is easily and compactly collapsed for storage or carrying, yet which may be extended to an operating position which is sufficient in size to carry a large load.

More specifically, an object of the invention is to provide a novel foldable hand truck having an elongate central member which is telescopic to provide an elongate handle, and having a pair of load supporting arms wich may be folded compactly against the central member, yet which when swung outwardly to operating positions diverge on progressing outwardly from the central member to provide a wide load support platform. A pair of wheel-bearing legs are swingable between collapsed positions extending upwardly along the central member and extended positions extending at substantial angles outwardly from opposite sides thereof. Locking arms are connected to the swingout legs for locking the legs against swinging toward their collapsed positions when in their extended positions. Auxiliary load support arms on the wheel bearing legs may be swung against the legs for storage, or may be extended outwardly at substantial angles forwardly therefrom for supporting a load.

A still further object of the present invention is to provide a novel foldable hand truck having wheel assemblies mounted for swinging between collapsed and operating positions, and yieldable spring clips for releasably securing the wheel assemblies in either position.

DRAWINGS

These and other objects and advantages will become more fully apparent as the following description is read in conjunction with the drawings wherein.

DETAILED DESCRIPTION OF A PREFERRED EMBODIMENT OF THE INVENTION

Figure 1:
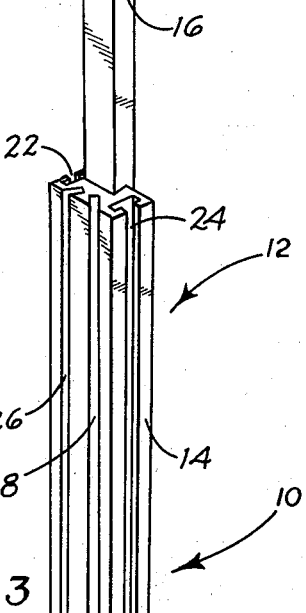
FIG. 1 is a front perspective view of a foldable hand truck constructed according to an embodiment of the invention, with the hand truck extended to operating position.

Referring to the drawings, and first more specifically to FIG. 1 at 10 is indicated generally a hand truck constructed according to an embodiment of the invention. The hand truck includes an elongate, telescopic central member 12. The central member consists of an elongate extruded member 14 having the cross sectional configuration illustrated in FIG. 3 and as seen from a bottom end view in FIG. 4, and an elongate bar 16 which is telescopic within member 14, as will be hereinafter described.

Figure 3:
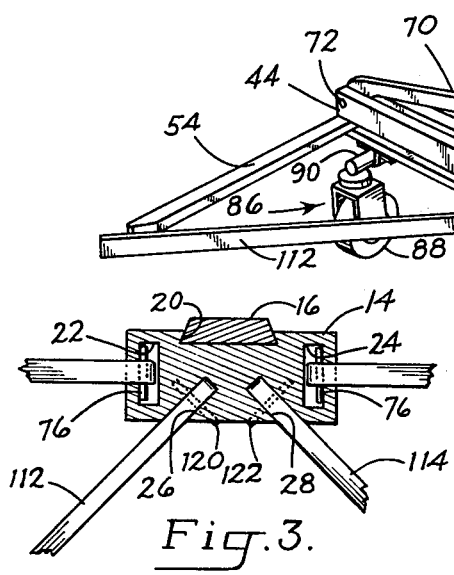
FIG. 3 is an enlarged view taken along the line 3—3 in FIG. 1.
Figure 4:
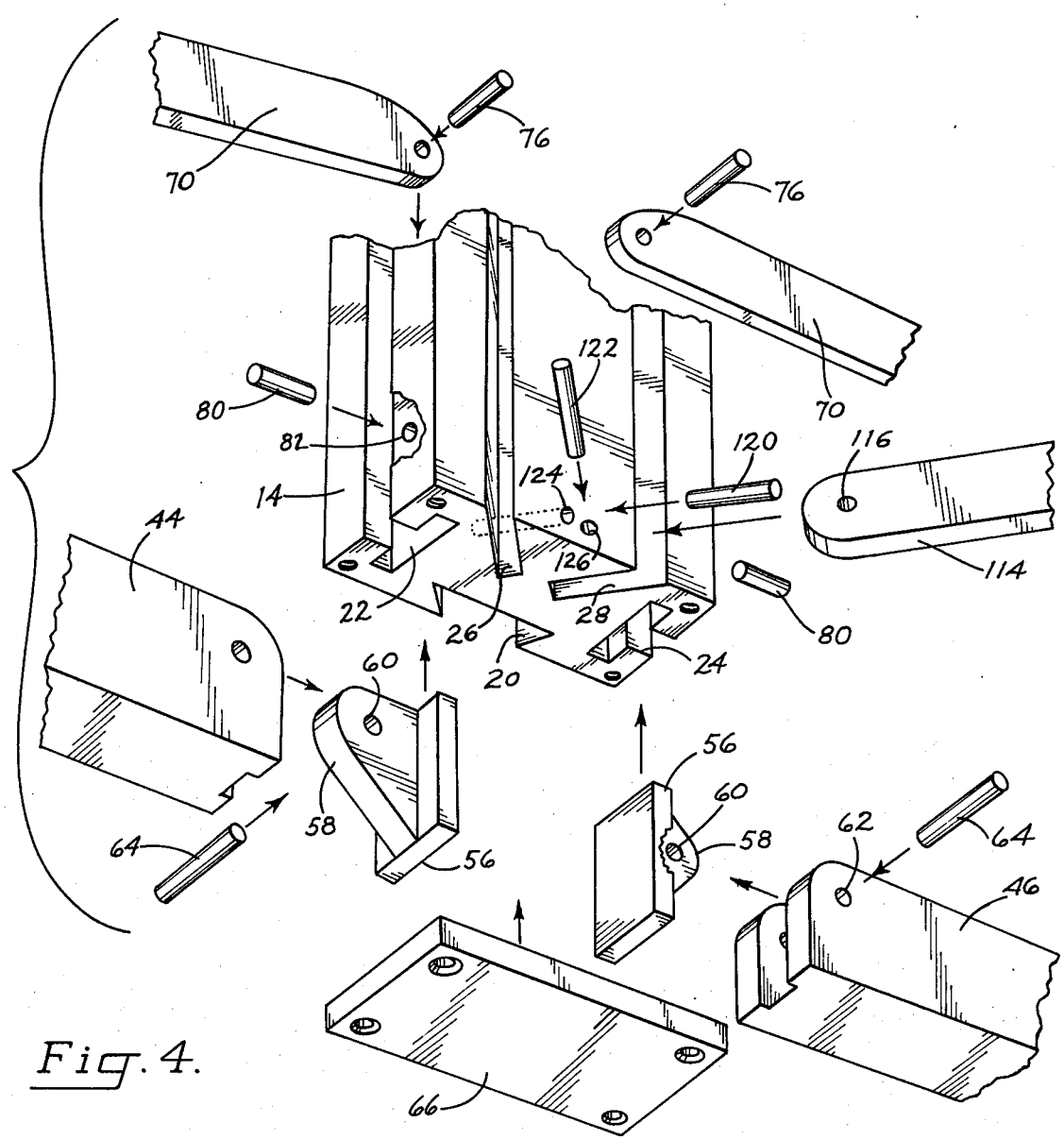
FIG. 4 is an enlarged exploded view of the lower end of the hand truck illustrating the various parts for pivotally connecting the load support arms, wheel-bearing legs, and locking arms to the central member.

Referring to FIGS. 3 and 4, it will be seen that member 14 includes a dovetail shaped slide track 20 in its rear side for receiving bar 16. A pair of substantially T-shaped slide tracks 22, 24 are defined in opposite side margins of member 14. A pair of slots 26, 28 are formed in the forward side of member 14. As is best seen in FIGS. 3 and 4, slots, 26, 28 extend longitudinally of member 14, but are formed at an angle to each other whereby they diverge on progressing outwardly from their inner margins to the regions at which they open to the forward face of member 14.

Figure 2:
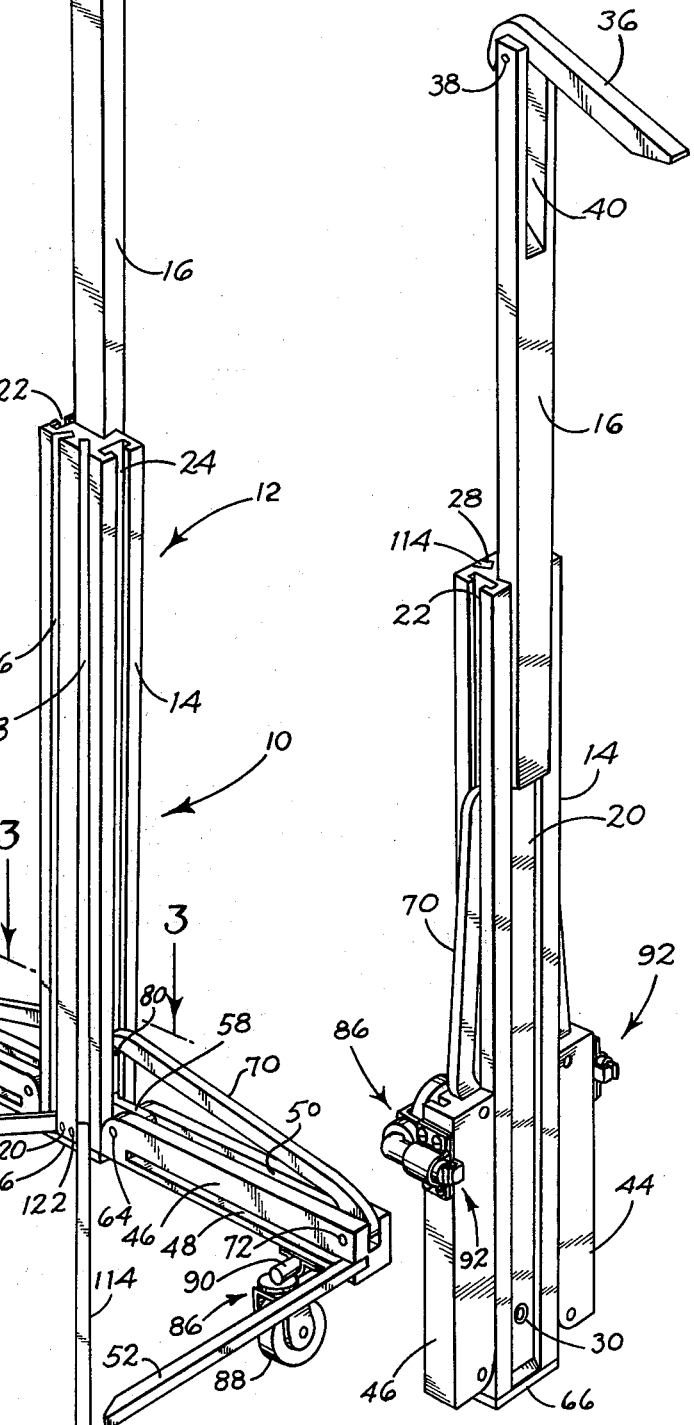
FIG. 2 is a rear perspective view of the hand truck of FIG. 1 illustrating portions thereof in their collapsed positions for storage or carrying.

Bar 16, as is seen in FIG. 3, has beveled opposed edge margins which are slidably received in track 20. The bar 16 may be slid vertically in track 20 between the extended position as illustrated in FIGS. 1 and 2 and a collapsed position slid downwardly to be fully received in track 20. As is best seen in FIG. 2, a spring biased ball 30 is mounted within track 20 to engage a hole or depression, in bar 16 to releasably secure the bar in its collapsed position when lowered. A similar spring biased ball (not shown) is mounted in track 20 adjacent the top end of extrusion 14 to engage the hole in bar 16 to releasably secure it in its extended position as illustrated.

A handle 36 is pivotally mounted at 38 to the upper end of bar 16. The handle is swingable between the operating position illustrated and a stored position received in slot 40 formed in the back of bar 16.

A pair of elongate legs 44, 46 are pivotally connected adjacent their inner set of ends to the lower end of member 14 for swinging between extended positions, as illustrated in FIG. 1, extending outwardly at substantial angles from opposite sides of the central member, and collapsed positions as illustrated in FIG. 2 extending upwardly along opposite sides of the central member. Legs 44, 46 are substantially similar, and thus only one will be described in detail.

Describing leg 46, it is an elongate member having elongate grooves, or slots, 48, 50 formed in and extending along its forwardly facing and upwardly facing surfaces respectively. An elongate leg-mounted load support arm 52 is pivotally connected at one of its ends in groove 48 and is swingable between a position received within the groove and an operating position extending substantially normally outwardly from the arm as illustrated in FIG. 1. A similar swingable arm 54 is pivotally connected to the outer end of leg 44.

Referring to FIG. 4, a connector plate 56 is received in slot 24 with a lug 58 thereon extending outwardly through the opening in slot 24. Lug 58 has a hole 60 formed therein which aligns with a hole 62 in arm 46 to receive a pin 64 by which the connector plate and leg 46 are pivotally connected. This pivotal connection between the connector plate 56 and leg 46 permits the aforementioned swinging of the leg between extended and collapsed positions as illustrated in FIGS. 1 and 2, respectively.

A cover plate 66 is secured, as by screws, to the lower end of extrusion 14 to hold connector plates 56 within slots 22, 24. Cover plate 26 also extends across the lower ends of slots 26, 28 for a purpose which will be described below.

A pair of locking arms 70 are pivotally connected at their outer sets of ends at 72 to the outer ends of legs 44, 46. The inner ends of locking arms 70 extend inwardly through the open sides of slots 22, 24 and have pins 76 extending therethrough which are slidably received in tracks 22, 24 to slidably mount the inner ends of locking arm 70 for movement longitudinally of the central member. Pins 80 received in holes 82 in tracks 22, 24 are positioned to limit downward movement of the inner ends of locking arms 70.

Wheel assemblies 86 are mounted adjacent the outer ends of legs 44, 46. The wheel assemblies include castered wheels 88 which are rotatably connected to the outer ends of swivel shafts 90 through which they are connected to the legs. Shafts 90 are rotatable, as will be explained below, between an operating position as illustrated in FIG. 1 in which wheels 88 extend downwardly at a substantial angle from the undersides of legs 44, 46 to provide support for the hand truck, and positions disposed at 180° thereto as illustrated in FIG. 2 positioned closely adjacent forwardly facing surfaces of their associated legs.

Figure 5:
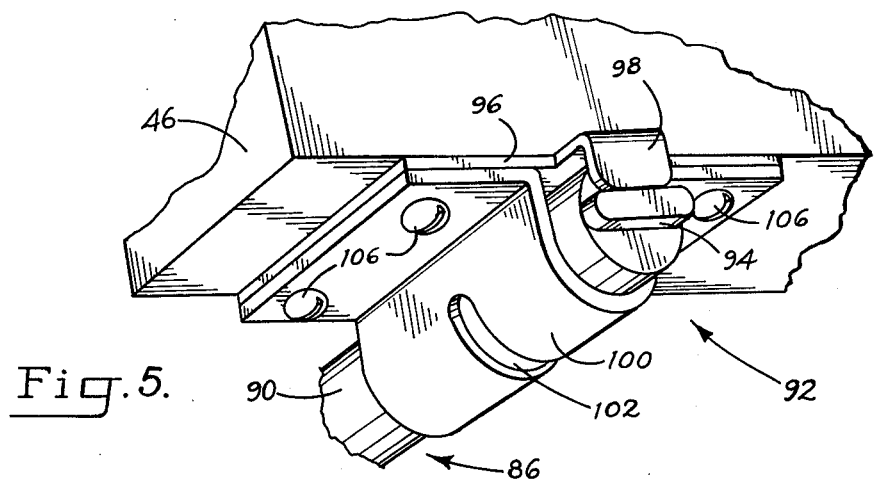
FIG. 5 is an enlarged perspective view of a spring clip used to releasably secure a wheel assembly in either a stored or operating position.

In FIG. 2 a spring clip assembly for releasably securing a wheel assembly in a selected position is noted generally at 92. Referring to FIG. 5, a spring clip assembly for a wheel assembly is illustrated in greater detail. As is seen in FIG. 5, the end of shaft 90 has an elongate projection 94 formed thereon which extends substantially diametrically of the end of the shaft. Although it is not illustrated, the shaft has an annular groove formed therein spaced inwardly from the end bearing projection 94.

The mounting includes a spring plate 96 having a downwardly bent spring lip 98 positioned to engage projection 94, as will be described below. A cover plate 100 has an arcuate central portion which extends about shaft 90 and has an inwardly impressed portion 102 positioned to be received in the previously mentioned annular groove in shaft 90 to inhibit longitudinal movement of the shaft. Plates 96, 100 are secured by screws 106 to the underside of leg 46 with shaft 90 rotatably mounted therebetween.

Explaining operation of the shaft mounting, when the shaft is rotated to a position whereby the castered wheel 88 of the wheel assembly is projecting downwardly from leg 46, the shaft is in the position illustrated. Spring lip 98 engaging projection 94 serves to hold the shaft and wheel in an operating position. When it is desired to collapse the device it is a simple matter to forcibly rotate the castered wheel and shaft 90 about the longitudinal axis of the shaft. When this is done, spring lip 98 gives somewhat to permit shaft 90 and projection 94 to rotate thereunder to a position 180° therefrom. When the shaft reaches this position 180° from its operating position, the castered wheel extends upwardly along the forward face of the leg as illustrated in FIG. 2 and spring lip 98 engaging projection 94 serves to hold it in this position.

Figure 6:
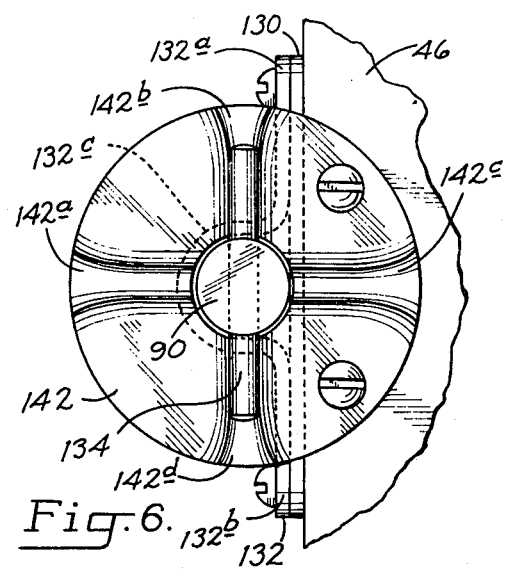
FIG. 6 is a face view of modified spring clip for holding a wheel assembly.
Figure 7:
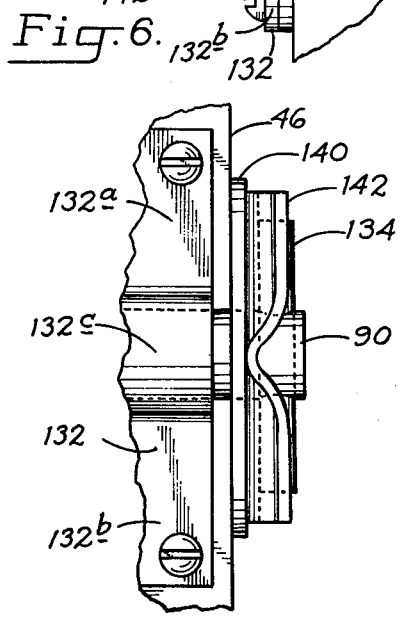
FIG. 7 is a side elevation view of the spring clip of FIG. 6.

In FIGS. 6 and 7 is illustrated a modified spring assembly for holding a wheel assembly in a selected position. Again, at 46 is indicated a portion of a leg of the hand truck. Secured to one face of leg 46 by screws are a flat wear plate 130 and a cover plate 132 having flat portions 132a, 132b interconnected by a U-shaped central portion 132c. Shaft 90 is rotatably received in the opening provided between U-shaped section 132c and wear plate 130. An elongate pin 134 extends through a bore in shaft 90 normal to the longitudinal axis of the shaft and is secured therein, with the pin projecting outwardly from opposite sides of the shaft.

Secured to another face of leg 46 are a flat washer 140 and a spring washer 142. The spring washer has a plurality of flutes, or U-shaped depressions, 142a, 142b, 142c and 142d formed therein which radiate outwardly from a central bore through which shaft 90 extends and which are disposed at 90° to each other.

The interengagement of pin 134 in a pair of diametrically opposed flutes, or grooves, in spring washer 142 serves to releasably hold a wheel assembly in a selected position. Should it be desired to rotate the wheel assembly to a different position the wheel assembly and shaft 90 associated therewith are rotated about the longitudinal axis of the shaft which forces the ends of pin 134 from the grooves in which it rests and permits it to be rotated to a position in which the pins are received and releasably held in another pair of diametrically opposed grooves.

A pair of elongate load support arms 112, 114 have inner ends received in slots 26, 28, respectively. The inner ends of arms 112, 114 have bores extending therethrough, such as bore 116 illustrated in arm 114 in FIG. 4. A pair of pivot pins 120, 122 extend through accommodating bores, 124, 126 in member 14 and through the bores in the inner ends of arms 112, 114 to pivotally connect the load support arms to the extrusion. The pivot pins are disposed in a plane extending substantially normal to a longitudinal axis of central member 12 and are disposed at a substantial angle relative to each other. They thereby provide pivot axes for arms 112, 114 which are disposed in a plane extending substantially normal to the longitudinal axis of central member 12 and at substantial angles relative to each other. The arms, 112, 114 are swingable between stored positions received in slots 26, 28 and extended positions, as illustrated in FIG. 1, extending substantially normally outwardly from the central member and at a substantial angle relative to each other whereby they diverge on progressing away from the central member. Cover plate 66 at the base of the central member serves as a stop member to limit lowering of arms 112, 114 to positions which are disposed substantially normal to the longitudinal axis of the central member.

Describing operation of the device, and considering that it is first in its collapsed state, bar 16 and handle 36 are first extended as illustrated in FIG. 2. Legs 44, 46 then are swung outwardly and away from opposite sides of central member. As they are thus swung apart, the inner ends of locking arms 70 slide downwardly in tracks 22, 24 to assume the position illustrated in FIG. 1. As illustrated in FIG. 1, arms 44, 46 extend substantially normally outwardly from opposite sides of the central member and locking arms 70 are disposed at low angles relative to legs 44, 46. The locking arms provide braces for legs 44, 46 against collapsing upwardly toward the central member and the frictional forces existing between the inner ends of locking arms 70 and the central member prevent them from sliding upwardly in tracks 22, 24 of their own accord.

Wheel assemblies 86 are rotated against the securing force of spring lip 98 engaging projection 94 on shaft 90 to swing them from the collapsed positions illustrated in FIG. 2 to the operating positions illustrated in FIG. 1. Load support arms 52, 54 may be swung outwardly from the forward faces of legs 44, 46 and load support arms 112, 114 are swung downwardly and outwardly from slots 26, 28 in the forward face of the central member to the positions illustrated in FIG. 1. Load support arms 52, 54 and 112, 114 provide a load support platform on which luggage or other material may be carried.

When it is desired to collapse the device, it is a simple matter to manually raise the inner ends of locking arms 70 when a load has been removed from the hand truck, with such raising of the inner ends swinging legs 44, 46 upwardly to collapsed positions as illustrated in FIG. 2. Load support arms 52, 54, 112, 114 are swung inwardly into their respective receiving slots, and castered wheel assemblies 86 are rotated to their collapsed position as illustrated in FIG. 2 where they are held by spring lip 98. Handle 36 is swung downwardly into slot 40 and bar 16 is telescoped into slot 20 in the back side of member 14.

While a preferred embodiment of the invention has been described herein, it should be apparent to those skilled in the art that variations and modifications are possible without departing from the spirit of the invention.

What is claimed is:

1. A foldable hand truck comprising
an elongate telescopic central member,
load support means connected to said central member,
a pair of legs swingably connected adjacent an inner set of their ends to the lower end of said central member for swinging relative to said central member between collapsed positions extending upwardly along and adjacent said central member and extended positions extending outwardly from opposite sides of said central member, substantially normal thereto,
a wheel assembly connected to each of said legs, adjacent the outer end thereof, for supporting said truck above a ground surface when said legs are extended,
a pair of elongate locking arms, each of said locking arms being pivotally connected adjacent one of its ends to one of said legs in a region spaced a distance from the inner end of said leg, said locking arms being independently movable with respect to each other,
a pair of tracks defined in said central member and extending longitudinally thereof, and
means slidably mounting the end of each of said locking arms, opposite its said one end, within an associated track above the pivot connection between said legs and central member, said locking arm being mounted for movement therealong between a locked position adjacent said inner end of said leg, wherein said locking arm extends at a low angle relative to its associated leg, such that the tendency of said leg to swing from its extended to its collapsed position causes the locking arm to press against said central member to frictionally lock said leg in its extended position, and a position slid upwardly along said central member to permit swinging of said leg to its collapsed position wherein said locking arm and the associated elongate leg are disposed adjacent said central member.

2. The truck of claim 1 wherein each said wheel assembly is swingably connected adjacent the outer end of its associated leg, said wheel assembly being mounted for swinging between a stored position in which it is closely adjacent a face of said leg, and an operating position projecting outwardly from said leg, and means for releasably securing said wheel assembly in its stored or operating position.

3. The truck of claim 2, wherein said releasable securing means for said wheel assembly comprises a spring clip yieldably engaging and holding said wheel assembly in either its stored or operating position.

4. The truck of claim 1 which further comprises a pair of elongate leg-mounted load support arms, each support arm being pivotally connected adjacent one of its ends to one of said legs for swinging between a stored position extending along and closely adjacent a side of said leg and an operating position extending outwardly at a substantial angle relative to said leg.

5. The truck of claim 1 wherein said load support means comprises a pair of elongate load support arms pivotally mounted on said central member for unrestricted downward and upward swinging movement between collapsed positions extending substantially parallel to the longitudinal axis of said central member and support positions extending outwardly substantially normal to the longitudinal axis of said central member and disposed at a substantial angle relative to each other, with said support arms diverging on progressing away from said central member, and stop means attached to said central member for preventing the downward swinging of each of said support arms beyond its support position.

* * * * *